(No Model.)
B. F. PERKINS.
SELF CLOSING HOSE PIPE.
No. 450,679. Patented Apr. 21, 1891.
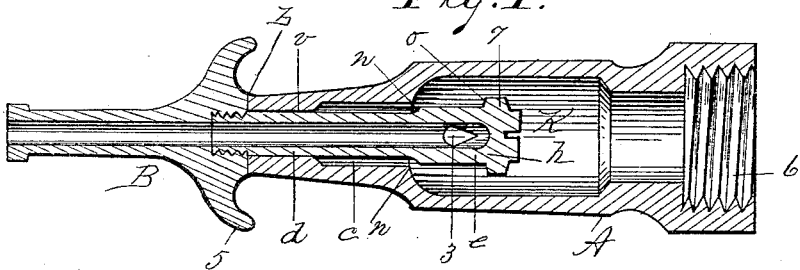
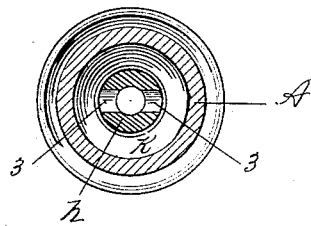
Witnesses:
G. M. Chamberlain
A. J. Flanagan
Inventor,
Benj. F. Perkins,
by
Chapin & Co., Att'ys.

UNITED STATES PATENT OFFICE.

BENJAMIN F. PERKINS, OF HOLYOKE, MASSACHUSETTS.

SELF-CLOSING HOSE-PIPE.

SPECIFICATION forming part of Letters Patent No. 450,679, dated April 21, 1891.

Application filed September 24, 1890. Serial No. 365,973. (No model.)

*To all whom it may concern:*

Be it known that I, BENJAMIN F. PERKINS, a citizen of the United States, residing at Holyoke, in the county of Hampden and State of Massachusetts, have invented new and useful Improvements in Self-Closing Hose-Pipes, of which the following is a specification.

This invention relates to hose-pipes, the object being to provide an improved self-closing pipe normally closed by water-pressure or by gravity, and is capable of being held more or less open by the operator for the purpose of delivering either a solid or a spraying stream of water therefrom, all as hereinafter fully described.

In the drawings forming part of this specification, Figure 1 is a longitudinal sectional view of a hose-pipe constructed according to my invention. Fig. 2 is a transverse section of the same.

In the drawings, A is the main tubular part or body of the hose-pipe, preferably of cylindrical form, provided with the usual screw-thread $G$ at its large end, by which a hose or other water-conduit is coupled thereto. Said hose-pipe A is provided with an extension $c$ of its main internal water-chamber K, and from said chamber-extension $c$ to the smaller end of said pipe at $b$ is formed a valve-spindle passage $v$, and a valve-seat is formed at $n$ around the inner end of said chamber-extension $c$. A valve $h$, preferably of cylindrical tubular form, has a head 7, around which is formed a seat $o$, and adjoining said seat the valve has a cylindrical portion $e$, which fits fairly free into said chamber-extension $c$; but the latter is somewhat longer than said valve part $e$, so that during the entire movement of said part $e$ in said chamber-extension $c$, while the valve $h$ is moving from the position shown in Fig. 1, which is its open one, to its below-described closed one, the forward end of said enlargement shall act against the water in said chamber $c$ and prevent such a sudden closing of the valve-seat $o$ against said seat $n$ on the pipe A as may cause a "water-hammer" and the consequent bursting of hose to which the pipe A may be connected. The water in the chamber-extension $c$ slowly escapes therefrom under the above-named conditions between the valve-spindle $d$ and the inner wall of the passage $v$, in which said spindle moves.

The valve $h$ has one or more (two being the preferable number) openings 3 through its sides, preferably of oblong shape or of a combined V and circular form, as shown, which open water-communication between the chamber K and the interior of the valve and its spindle $d$, the outer end of which is screw-threaded, as shown, to provide for screwing the hose-pipe nozzle B thereon. A screw-driver slot is made in the end of the valve $h$ for convenience in holding or turning the valve when said nozzle and valve-spindle are screwed together. Said nozzle B is provided with a central water-passage communicating with that of the valve-spindle, and with a screwed socket to receive the end of the valve-spindle, and with a lateral projection 5 wholly or partially surrounding the same, but preferably of disk-like form or any other shape most convenient to be grasped by the hand or fingers for the purpose of forcing the valve-spindle and valve against the water-pressure inwardly to the position shown in Fig. 1, whereby said valve is opened.

The operation of the within-described improved hose-pipe is as follows: It will be understood that normally the valve and its spindle, together with the nozzle B, have a free movement in and at the end of the hose-pipe A, and that when the pipe is suspended from a hose-pipe the valve is automatically closed, so that any water admitted to the hose under these conditions cannot escape therefrom through the hose-pipe, since the openings 3 in the sides of the valve can receive no water from the chamber K; also, that should the hose-pipe occupy any other position than a pending one, as aforesaid, whereby the valve may drop from its seat, leaving it open, as in Fig. 1, if water be let into the hose and pipe, the force thereof, acting against the inner end of the valve, will cause the latter to close against its seat on the hose-pipe and prevent, as aforesaid, any escape of water through the pipe. When the valve $h$ is closed against its seat $n$ in the pipe A, the lower end of the nozzle B is proportionately moved outward beyond the end $b$ of said hose-pipe.

The use of open hose-pipes on hose in manufactories, warehouses, hotels, and other places has caused frequent and serious losses when by reason of a fire-alarm the hose is hurriedly run off through the room or rooms and the water is let on before the fire is reached, thereby wasting much water and causing great damage by wetting parts of the building and the property therein before the fire is reached; also, great loss of water ensues by dropping and leaving a hose-pipe through which water is running when forced to do so, as firemen often are at a fire. By the use, however, of the within-described improved automatically-closing hose-pipe the above-referred-to and other similar losses and inconveniences are avoided.

In using said hose-pipe at a fire the operator may at pleasure employ either a solid stream of water or produce a spray of varying volume, the first being produced by grasping the lateral projection 5 on the hose-nozzle and forcing the latter toward the end of the pipe A and quite against it, as shown in Fig. 1, thereby bringing the openings 3 in the sides of the valve *h* fully into communication with water in the chamber K, and the latter effect is produced by moving the hose-nozzle and the valve inwardly to such degree as only partially uncovers the said openings 3, whereby the streams of water entering the latter become so much broken that the water escapes from the nozzle in the form of spray and of greater or less volume, according to the degree of said partial opening, it being understood that said "partial opening" is accomplished by carrying the openings 3 in the sides of the valve more or less beyond the line of the valve-seat *n* in the pipe A. The hose-pipe will deliver water only so long as the valve is held open by the operator. Therefore, when he lets go of the hose-nozzle the valve will shut and stop the flow of water, but gradually, as above described, by reason of the movement of the valve against the water-cushion in the chamber *c*.

Having fully described my invention, what I claim, and desire to secure by Letters Patent, is—

In combination, a hose-pipe having therethrough, in longitudinal alignment and in communication with each other, a main passage K, a passage *c* forward thereof of a reduced diameter, and in advance of said passage *c* a still further contracted passage *v*, which leads to the forward end of the pipe, a valve-spindle closed at its rear end and forward thereof, formed tubular and open at its forward end and by a forward portion thereof of a diameter to fit the passage *v* and having a portion *e* at the rear thereof of a diameter to fit the passage *c*, and having the apertures 3 3 formed in said portion *e* and the nozzle on the forward extension of said valve-spindle, substantially as and for the purposes set forth.

BENJAMIN F. PERKINS.

Witnesses
G. M. CHAMBERLAIN,
H. A. CHAPIN.